US007168480B2

(12) United States Patent
Jankowski et al.

(10) Patent No.: US 7,168,480 B2
(45) Date of Patent: Jan. 30, 2007

(54) OFF-AXIS COOLING OF ROTATING DEVICES USING A CRANK-SHAPED HEAT PIPE

(75) Inventors: Todd A. Jankowski, Los Alamos, NM (US); F. Coyne Prenger, Los Alamos, NM (US); Joseph A. Waynert, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 32 days.

(21) Appl. No.: 10/835,897

(22) Filed: Apr. 29, 2004

(65) Prior Publication Data

US 2005/0241807 A1 Nov. 3, 2005

(51) Int. Cl.
*F28D 15/04* (2006.01)

(52) U.S. Cl. ............................... 165/104.26; 165/80.4; 165/185

(58) Field of Classification Search ........... 165/104.26, 165/104.33, 104.21, 185, 80.4; 361/700; 174/15.2
See application file for complete search history.

(56) References Cited

U.S. PATENT DOCUMENTS

| | | | | |
|---|---|---|---|---|
| 3,229,759 A | * | 1/1966 | Grover | 165/104.26 |
| 3,283,787 A | * | 11/1966 | Davis | 138/148 |
| 3,576,210 A | * | 4/1971 | Trent | 165/104.26 |
| 3,604,503 A | * | 9/1971 | Feldman et al. | 165/96 |
| 3,677,329 A | * | 7/1972 | Kirkpatrick | 165/104.26 |
| 3,681,843 A | * | 8/1972 | Arcella et al. | 29/423 |
| 3,765,480 A | * | 10/1973 | Fries | 165/86 |
| 3,892,273 A | * | 7/1975 | Nelson | 165/104.26 |
| 3,921,710 A | * | 11/1975 | Katayama | 165/104.26 |
| 4,003,427 A | * | 1/1977 | Leinoff et al. | 165/104.26 |
| 4,109,709 A | * | 8/1978 | Honda et al. | 165/104.26 |
| 4,336,837 A | * | 6/1982 | Koenig | 165/104.22 |
| 4,345,642 A | * | 8/1982 | Ernst et al. | 165/86 |
| 4,408,656 A | * | 10/1983 | Levenspiel et al. | 165/104.26 |
| 5,076,352 A | * | 12/1991 | Rosenfeld et al. | 165/104.26 |
| 5,848,532 A | | 12/1998 | Gamble et al. | |
| 6,041,850 A | * | 3/2000 | Esser et al. | 165/104.33 |

(Continued)

FOREIGN PATENT DOCUMENTS

JP 4-190091 * 7/1992 ............ 165/104.21

(Continued)

OTHER PUBLICATIONS

Keith A. Woloshun et al., "HTPIPE: A Steady-State Heat Pipe Analysis Program," LA-11324-M, UC-405, pp. 1-19, issued Nov. 1988.

(Continued)

*Primary Examiner*—Teresa J. Walberg
(74) *Attorney, Agent, or Firm*—Mark N. Fitzgerald; Robert P. Santandrea

(57) ABSTRACT

The present invention is a crank-shaped heat pipe for cooling rotating machinery and a corresponding method of manufacture. The crank-shaped heat pipe comprises a sealed cylindrical tube with an enclosed inner wick structure. The crank-shaped heat pipe includes a condenser section, an adiabatic section, and an evaporator section. The crank-shape is defined by a first curve and a second curve existing in the evaporator section or the adiabatic section of the heat pipe. A working fluid within the heat pipe provides the heat transfer mechanism.

13 Claims, 16 Drawing Sheets

U.S. PATENT DOCUMENTS

| | | | |
|---|---|---|---|
| 6,394,777 B2 * | 5/2002 | Haavik | 418/85 |
| 6,466,441 B1 * | 10/2002 | Suzuki | 361/695 |
| 6,489,701 B1 | 12/2002 | Gamble et al. | |
| 2003/0107275 A1 | 6/2003 | Gamble et al. | |

FOREIGN PATENT DOCUMENTS

| | | | | |
|---|---|---|---|---|
| JP | 6-129787 | * | 5/1994 | 177/168 |

OTHER PUBLICATIONS

G. F. Hewitt et al., "Annular Two-Phase Flow," Chemical Engineering Division, A.E.R.E., Harwell, England, pp. 98-102, 1970.

Funada et al., "Viscous Potential Flow Analysis of Kelvin-Helmoholtz Instability in a Channel," J. Fluid Mech. (2001), vol. 445, pp. 263-283.

* cited by examiner

OFF-AXIS COOLING OF ROTATING DEVICES USING A CRANK-SHAPED HEAT PIPE

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to heat transfer equipment, and, more particularly, to a design for a heat pipe.

BACKGROUND OF THE INVENTION

A heat pipe is a device that uses the heat of vaporization of a working fluid to transfer heat. If heat is added to a saturated fluid (a physical condition where the liquid and vapor phases coexist in equilibrium) at constant pressure, the energy addition will vaporize a portion of the liquid in an isothermal (constant temperature) process. Similarly, if heat is removed from a saturated fluid at constant pressure, a portion of the existing vapor will condense in an isothermal process.

A heat pipe uses the circulation of a saturated working fluid to transfer heat between two locations. The heat pipe is a sealed enclosure containing a two-phase liquid-vapor mixture. One end of the heat pipe is placed in contact with a heat source (referred to as the evaporator section), while the other end of the heat pipe is placed in contact with a heat sink (referred to as the condenser section). The heat pipe is designed and built so that during operation, the vapor produced by the heat addition in the evaporator section is allowed to flow toward the condenser section of the heat pipe, while the liquid produced by the heat rejection in the condenser section is forced to flow to the evaporator section.

The driving force that produces a liquid flow to the evaporator section may be achieved through a body force (e.g., gravity or centrifugal force), or, a capillary force that is created by including within the heat pipe a porous material (e.g., fine mesh screen, sintered metals, or a gauze) that acts as a wick. The present invention comprises a heat pipe that uses the centrifugal body force created by a rotating crank-shaped design and an internal wick structure to assist working fluid circulation.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention is a crank-shaped heat pipe for cooling rotating machinery and a corresponding method of manufacture. The crank-shaped heat pipe comprises a sealed cylindrical tube with an enclosed inner wick structure. The crank-shaped heat pipe includes a condenser section, an adiabatic section, and an evaporator section. The crank-shape is defined by a first curve and a second curve existing in the evaporator section or adiabatic section of the heat pipe. A working fluid within the heat pipe provides the heat transfer mechanism.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention, a "crank-shaped" heat pipe, was designed for use as part of a thermal management system for a High Temperature Superconducting (HTS) electric generator. However, a mathematical model of the present invention indicates the present invention may be used to cool many types of rotating machinery, including, but not limited to, motors and generators. In addition, the mathematical model proves that the present invention may be used in rotating machinery operating in temperature ranges from cryogenic through liquid metal.

Mathematical Model:

Nomenclature:

| | |
|---|---|
| a | Busse's velocity profile correction factor |
| d | distance measured from the axis of rotation |
| f | the Darcy friction factor |
| $h_{fg}$ | latent heat of the working fluid |
| L | axial length |
| $\dot{m}$ | mass flow rate |
| P | pressure |
| $\Delta P_{cap}$ | maximum pressure difference supported by wick |
| $\dot{Q}$ | heat transfer rate |
| r | radial coordinate |
| R | inner radius of tube containing the working fluid |
| $r_e$ | effective pore radius of the wick |
| $Re_a$ | liquid phase axial Reynolds number |
| $Re_r$ | vapor phase radial Reynolds number |
| $Re_D$ | vapor phase axial Reynolds number |
| T | temperature |
| $\Delta V_c$ | critical relative velocity |
| $v_{fg}$ | volume change during vaporization |
| $v_r$ | velocity in the r-direction |
| $\bar{v}_v$ | average vapor velocity |
| $v_z$ | velocity in the z-direction |
| $\bar{v}_z$ | average liquid velocity in the z-direction |
| z | axial coordinate |

Greek symbols:

| | |
|---|---|
| α | angle between axis of rotation and the z-axis |
| δ | liquid layer thickness |
| η | dimensionless pressure difference supported by the wick |
| ρ | density |
| σ | surface tension |
| τ | shear stress |
| μ | dynamic viscosity |
| ω | rotation rate |

Subscripts:

| | |
|---|---|
| a | adiabatic section |
| c | condenser section |
| e | evaporator section |
| l | liquid phase |
| v | vapor phase |
| sat | saturation |
| wp | wet point |

Figure 1:
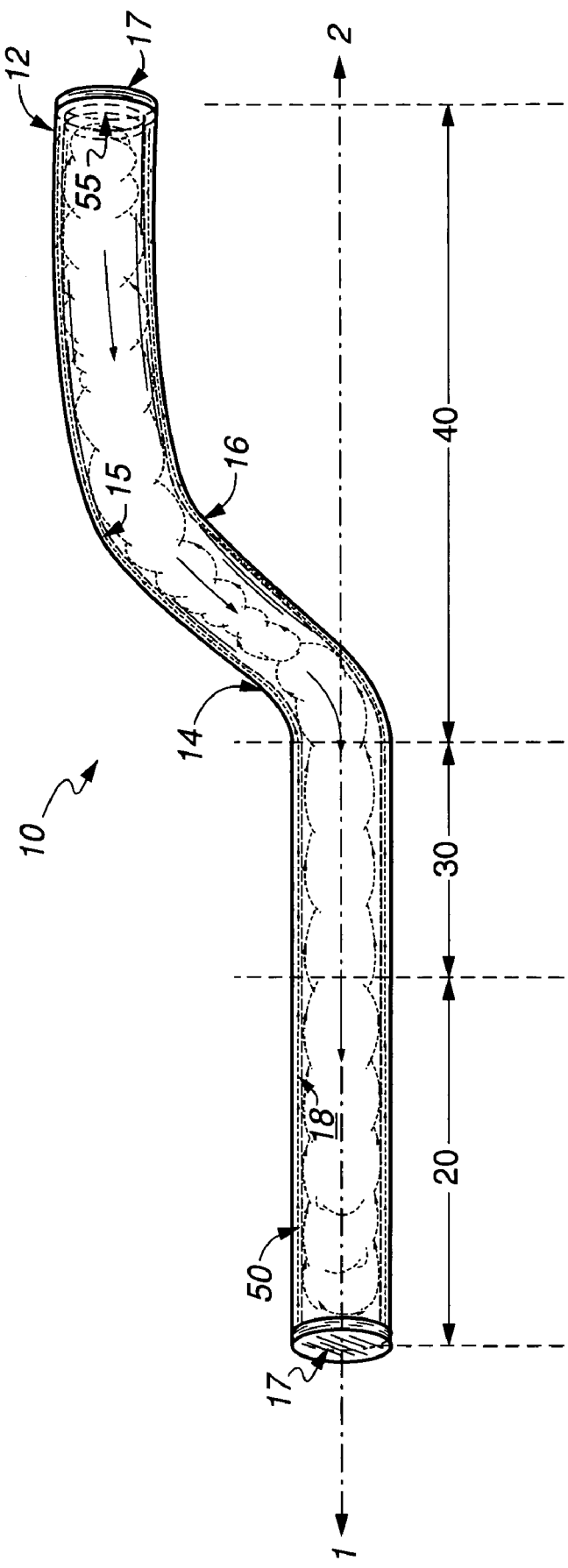
FIG. 1 is a pictorial illustration of the crank-shaped heat pipe.

Geometry:

Referring now to FIG. 1, heat pipe 10 is manufactured from cylindrical tube 12 that has first curve 14 and second curve 16 formed in evaporator section 40, which gives heat pipe 10 the crank-shape design. Tube 12 contains working fluid 18 that is the heat transfer mechanism of heat pipe 10, and caps 17, which confine working fluid 18 within tube 12. Adiabatic section 30 joins condenser section 20 and evaporator section 40 to form the entirety of heat pipe 10. Wick structure 50 resides within tube 12, and includes plug 55 on the end of evaporator section 40.

The centerline of condenser section 20 of heat pipe 10 is placed on or parallel to axis of rotation 1, 2, while an off-axis eccentrically rotating component of evaporator section 40 is in thermal contact with the heat generating windings of a rotating machine (not shown). Ideally, the longitudinal axis of condenser section 20 would lie on the axis of rotation of the rotating machine; however, the design of the rotating machine may require that the condenser section be displaced from the axis of rotation.

Figure 2A:
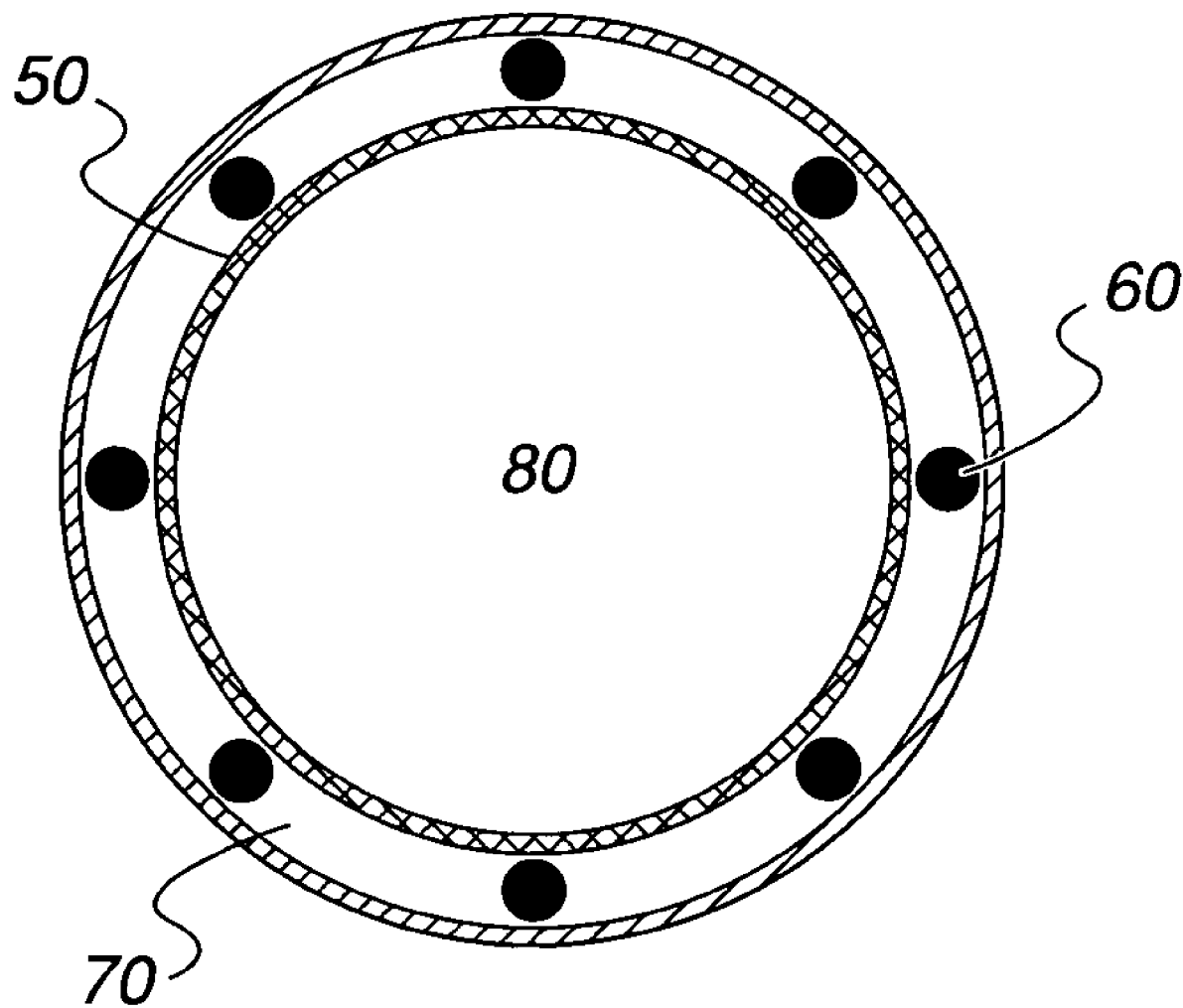
FIG. 2a is a cross-sectional view of a spacer wire embodiment of the crank-shaped heat pipe.
Figure 2B:
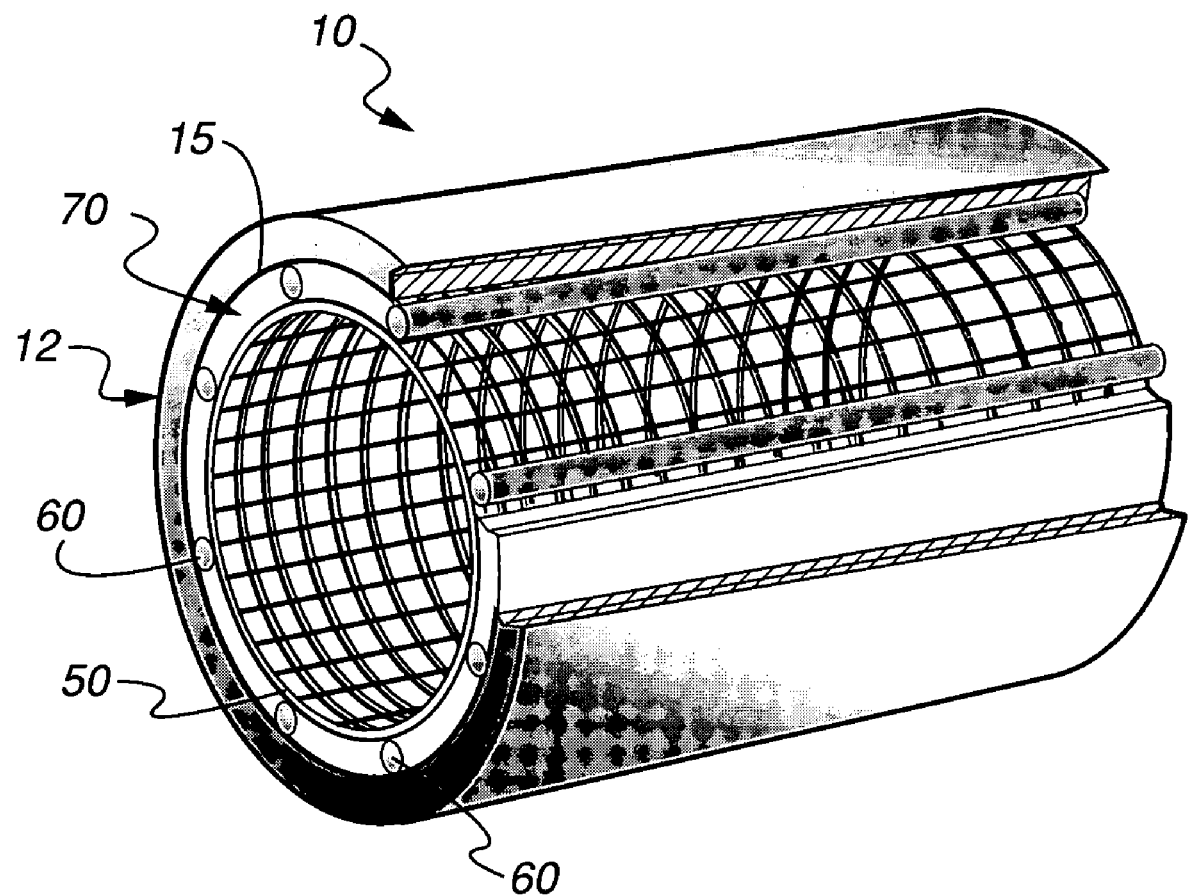
FIG. 2b is a 3-dimensional illustration of a spacer wire embodiment of the crank-shaped heat pipe.

Referring now to FIGS. 2a and 2b, within heat pipe 10, porous wick 50 is used to return liquid working fluid to evaporator section 40 when the rotating machine is stationary or in motion. Note that when heat pipe 10 is rotating, a rotation-induced centrifugal body force also assists in returning the liquid to evaporator section 40. Wick 50 is made from a fine mesh screen that is separated from inner wall 15 of heat pipe 10 by spacer wires 60 forming a separate liquid flow channel, annulus region 70, between the screen and the wall.

Once heat pipe 10 begins to rotate, the rotation-induced centrifugal body force acts on both the liquid and vapor phase of the working fluid. The rotation-induced body force assists in generating a flow of liquid to evaporator section 40. However, the liquid, once vaporized in evaporator section 40, must flow against this same rotation-induced body force to return to condenser section 20.

The component of the body force opposing the flow of vapor to condenser section 20 is balanced against the temperature difference between evaporator section 40 and condenser section 20. Efficient operation of the rotating machine requires that the temperature of condenser section 20 be as close to the temperature of evaporator section 40 as possible. The temperature difference between the evaporator section 40 and condenser section 20 is minimized through the designs of the crank shape and internal wick structure of heat pipe 10.

The wick geometry used in heat pipe 10 allows for a liquid return path to evaporator section 40 of heat pipe 10. Annulus 70 is created between wall 15 and wick 50 by using spacer wires 60. At low machinery rotation rates (less than 100 rpm), the liquid phase of the working fluid fills annulus 70 and the capillary pressure across wick 50 is sufficient to maintain working fluid circulation (wicked operation). Note that wick 50 is sealed with plug 55 on the end of evaporator section 40 in order to allow full capillary pressure to develop during stationary applications.

As the rotating machinery achieves higher rotation rates, the difference in pressure between the liquid and vapor phases is larger than the maximum pressure difference that can be supported by wick 50, and the liquid forms a film of variable thickness along wall 15 (non-wicked operation). Consequently, the vapor flowing toward the condenser section of the heat pipe is either confined inside vapor chamber 80 or interfaces directly with the liquid film in annulus region 70.

Figure 3:
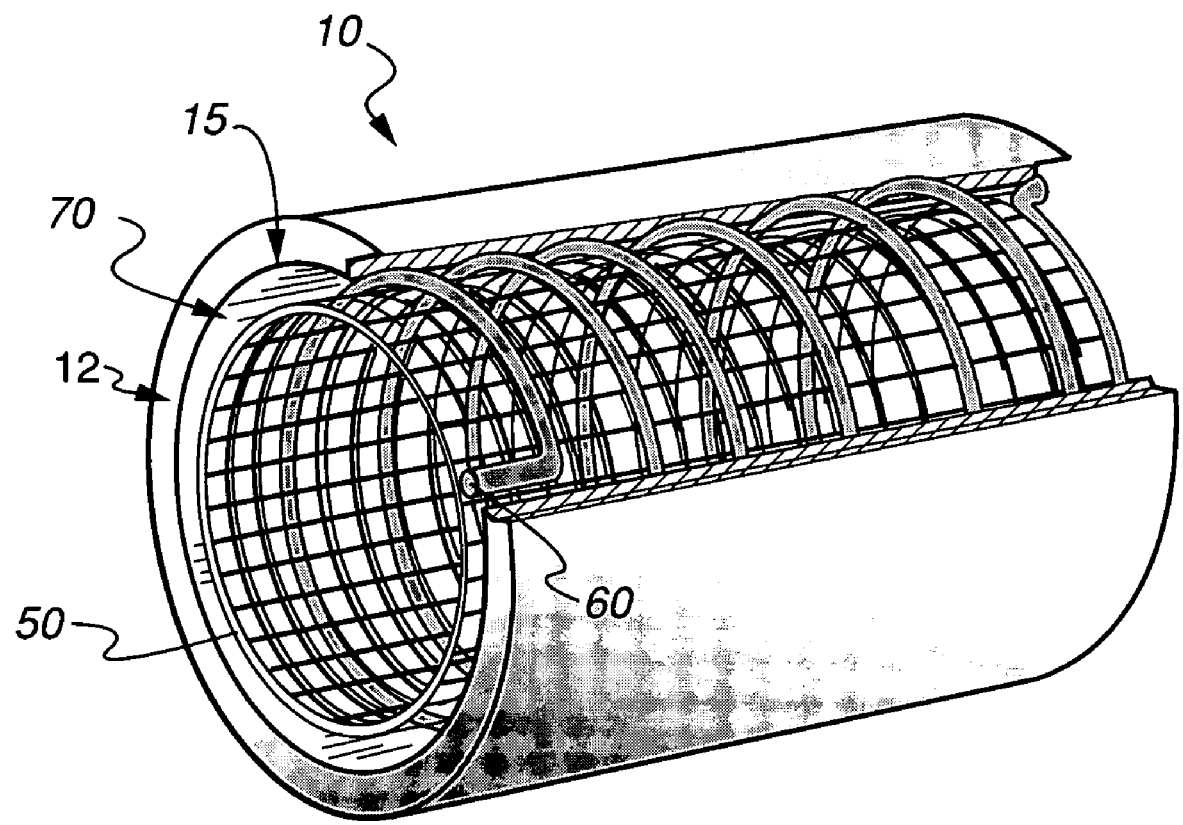
FIG. 3 is a 3-dimensional illustration of a spring-wick embodiment of the crank-shaped heat pipe.

Referring to FIG. 3, another wick embodiment involves the use of a spring-coil as spacer wire 60. This embodiment provides the same spacing function as the FIG. 2a, 2b embodiment, but simplifies the manufacture of the wick structure and is detailed in the assembly section of this specification.

A stagnant pool of liquid may form in evaporator section 40 if the off-axis eccentrically rotating portion is not parallel to the axis of rotation. Another embodiment of wick geometry, shown in FIG. 4, addresses this concern, and involves the use of outer wick 90 in contact with heat pipe inner wall 15. Spacer wires 60 separate outer wick 90 from wick 50. Outer wick 90 prevents the pooling of the liquid by wicking the liquid axially through the evaporator section, while ensuring that inner wall 15 remains wetted.

Figure 5:
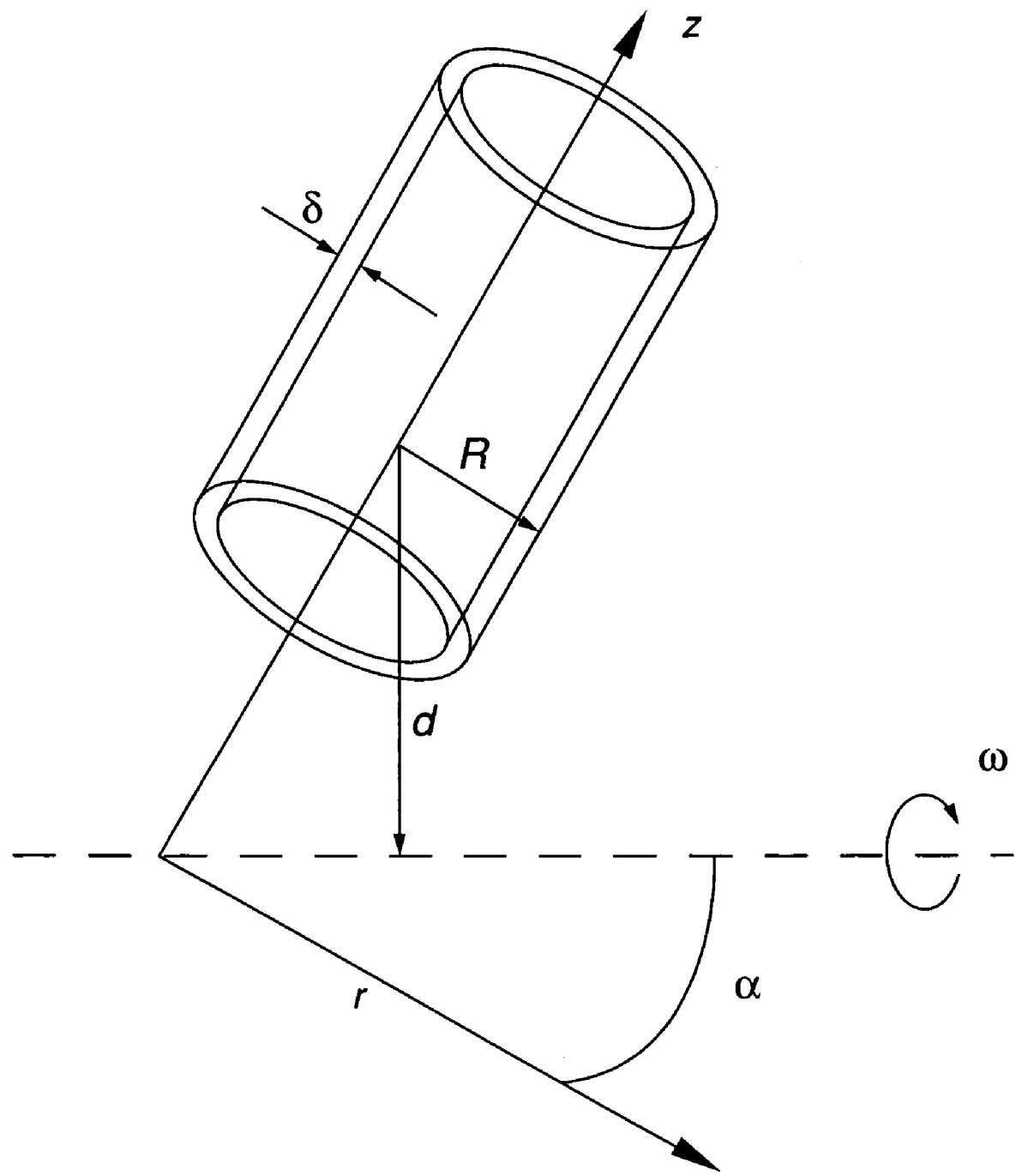
FIG. 5 is a pictorial illustration the parameters used in the analysis of the mass, momentum, and energy balance equations concerning the crank-shaped heat pipe.

The geometry for the mathematical model is displayed in FIG. 5. The liquid layer is viewed as a thin film of thickness δ in contact with inside wall 15 of heat pipe 10. The origin of the coordinate system is placed at the condenser end of the heat pipe, with the liquid flowing in the positive z-direction. The inner radius of the pipe is located at r=R. The liquid-vapor interface is located at r=R−δ. Angle α, defines the angle between the axis of rotation and the r-axis. Distance d is defined as the length from the axis of rotation to the centerline of the heat pipe. The liquid layer thickness, the angle from the axis of rotation, and the distance from the axis of rotation are all defined as functions of z [$\delta=\delta(z)$, $\alpha=\alpha(z)$, and $d=d(z)$].

Assumptions:

In order to properly mathematically model the present invention, one must apply the mass, momentum, and energy balance equations to the liquid flow within the annulus region. Several simplifying assumptions are made to apply these equations:

First, the liquid is in direct contact with the inner wall of the heat pipe, and the liquid flow in the annulus is assumed symmetric about the z-axis.

Second, the focus of the mathematical analysis of the rotating heat pipe is on the momentum fluxes in the z-direction. The component of the rotation induced body force acting in the r-direction leads to a second-order momentum flux in the z-direction. Only leading-order momentum fluxes are considered in the analysis (higher-order contributions are assumed to be negligible), so that the component of the rotation induced force acting in the r-direction is neglected in the mathematical analysis. Thus, the rotation induced body force acting on the liquid is assumed to act only in the z-direction.

Third, the composite wick structure is made from a material possessing a high thermal conductivity (metals such as copper), so that a high conductivity thermal path exists through the liquid layer. The high thermal conductivity of the wick allows for heat transfer with a very small temperature difference across the liquid layer. The negligible temperature gradients in the radial direction allow for the heat conduction term in the energy equation to be ignored.

Fourth, in order to determine the temperature profile within the heat pipe in the z-direction, the temperature of the liquid is set equal to the saturation temperature of the working fluid at the liquid-vapor interface. Note from above, assumption three, ignoring conduction through the liquid layer in the r-direction results in a liquid temperature that is independent of the radial coordinate, and, thus, only dependent on the z-coordinate.

Fifth, a uniform heat addition per unit length in the evaporator section and a uniform heat rejection per unit length in the condenser are assumed. The uniform heat addition and uniform heat rejection assumptions are the boundary conditions that best simulate the actual operating conditions of a heat pipe installed in a rotating machine. This is because the windings of a rotating machine, near the evaporator section, typically generate a uniform heat load per unit length, and the condenser section of the heat pipe is typically cooled by a forced flow of coolant leading to a nearly uniform heat rejection from the condenser.

The final assumption is that the axial flow Reynolds number $Re_a = \dot{Q}/(\mu_l h_{fg} R)$ is large (greater than one). A large axial flow Reynolds number in the liquid flow allows for a simplification of the full Navier-Stokes equations (the mass and momentum balance equations) to the given boundary layer equations.

Liquid Flow Analysis: Governing Equations

The uniform heat load assumption results in a linear increase in liquid mass flow rate when moving in the positive z-direction through the condenser section, a constant liquid mass flow rate in the adiabatic section, and a linear decrease in liquid mass flow rate in the evaporator section. The liquid mass flow rate is expressed as $$\dot{m}_l = \begin{cases} \dfrac{\dot{Q}}{h_{fg}} \dfrac{z}{L_c} & z < L_c \\ \dfrac{\dot{Q}}{h_{fg}} & L_c \leq z \leq (L_c + L_a) \\ \dfrac{\dot{Q}}{h_{fg}}\left(1 - \dfrac{z - L_c - L_a}{L_e}\right) & z > (L_c + L_a) \end{cases} \quad (1)$$

For an incompressible liquid flow that is symmetric about the z-axis, the continuity equation reduces to $$\frac{1}{r}\frac{\partial(rv_r)}{\partial r} + \frac{\partial v_z}{\partial z} = 0. \quad (2)$$

Using the given boundary layer assumptions, the momentum equations in the r and z-directions become r-direction:

$$\partial P_l / \partial r = 0 \quad (3)$$

z-direction:

$$\rho_l\left(v_r \frac{\partial v_z}{\partial r} + v_z \frac{\partial v_z}{\partial z}\right) = -\frac{\partial P_l}{\partial z} + \frac{\mu_l}{r}\frac{\partial}{\partial r}\left(r\frac{\partial v_z}{\partial r}\right) + \rho_l \omega^2 d \cos\alpha. \quad (4)$$

The momentum equation in the r-direction is integrated from $R-\delta$ to r, with a boundary condition that accommodates both working fluid flow regimes (wicked and non-wicked operation)

$$P_l(R-\delta,z) = P_v(R-\delta,z) - \Delta P_{cap}\eta, \quad (5)$$

where $\Delta P_{cap} = 2\sigma/r_e$ is the maximum capillary pressure head that can be supported by the wick and $\eta$ (a function of z only) varies between 0 and 1. The z-location for which $\eta=0$ represents a wet point in the heat pipe (where the pressure of the liquid is equal to the pressure of the vapor), while the condition $\eta=1$ represents the capillary limit of the heat pipe. Integrating Eq. (3) and applying the boundary condition in Eq. (5) yields $$P_l = P_v(R-\delta,z) - \Delta P_{cap}\eta. \quad (6)$$

Differentiating Eq. (6) with respect to z, and inserting the result into Eq. (4) yields $$\rho_l\left(v_r \frac{\partial v_z}{\partial r} + v_z \frac{\partial v_z}{\partial z}\right) = \quad (7)$$

$$-\frac{\partial P_v}{\partial z}\bigg|_{R-\delta} + \Delta P_{cap}\frac{d\eta}{dz} + \frac{\mu_l}{r}\frac{\partial}{\partial r}\left(r\frac{\partial v_z}{\partial r}\right) + \rho_l \omega^2 d \cos\alpha.$$

The continuity equation in Eq. (2) is integrated, and the boundary condition $v_r(R,z)=0$ at the wall of the heat pipe is used to yield $$v_r = -\frac{1}{r}\int_R^r r\frac{\partial v_z}{\partial z}dr. \quad (8)$$

Equation (8) is inserted into Eq. (7), and the resulting equation is integrated across the liquid layer to give the integral form of the momentum equation, or $$\rho_l \int_{R-\delta}^R \left(v_z \frac{\partial v_z}{\partial z} - \frac{1}{r}\frac{\partial v_z}{\partial r}\int_R^r r\frac{\partial v_z}{\partial z}dr\right)dr = \quad (9)$$
$$\left(-\frac{\partial P_v}{\partial Z}\bigg|_{R-\delta} + \Delta P_{cap}\frac{d\eta}{dz} + \rho_l\omega^2 d\cos\alpha\right)\delta + \mu_l \int_{R-\delta}^R \left[\frac{1}{r}\frac{\partial}{\partial r}\left(r\frac{\partial v_z}{\partial r}\right)\right]dr.$$

The viscous term [the last term in Eq. (9)] is integrated by parts to yield the integral form of the z-direction momentum equation $$\rho_l \int_{R-\delta}^R \left(v_z \frac{\partial v_z}{\partial z} - \frac{1}{r}\frac{\partial v_z}{\partial r}\int_R^r r\frac{\partial v_z}{\partial z}dr\right)dr = \quad (10)$$
$$\left(-\frac{\partial P_v}{\partial Z}\bigg|_{R-\delta} + \Delta P_{cap}\frac{d\eta}{dz} + \rho_l\omega^2 d\cos\alpha\right)\delta +$$
$$\mu_l\left[\frac{\partial v_z}{\partial r}\bigg|_R - \frac{\partial v_z}{\partial r}\bigg|_{R-\delta} + \frac{v_z(R,z)}{R} - \frac{v_z(R-\delta,z)}{R-\delta} + \int_{R-\delta}^R \frac{v_z}{r^2}dr\right].$$

Liquid Flow Analysis: Velocity Profiles

The first step in solving Eq. (10) is to define a velocity profile that satisfies the boundary conditions. A heat pipe operating in the wicked operating mode has an annular gap region full of liquid. Thus, the liquid phase of the working fluid will be in direct contact with the wick that is separated from the wall of the heat pipe. The liquid flow must satisfy the no-slip condition ($v_z=0$) at the wall of the heat pipe and at the wick. Therefore, the boundary conditions are wicked:

$$v_z(R,z)=0 \text{ and } v_z(R-\delta,z)=0. \quad (11)$$

In addition, the velocity, when integrated over the cross-sectional area of the liquid layer, must yield the mass flow rate. The definition of the mass flow rate is $$\frac{\dot{m}}{2\pi\rho_l} = \int_{R-\delta}^R r v_z dr. \quad (12)$$

If the liquid recedes from the wick, and a direct contact between the liquid and vapor is present, the interface condition (the condition at $r=R-\delta$) requires that the shear stress $\tau_{rz}$ be continuous across the interface. Assuming that the viscosity of the vapor is much less than the viscosity of the liquid yields $$\tau_{rz}(R-\delta, z) = \mu_l\left(\frac{\partial v_r}{\partial z}\bigg|_{R-\delta} + \frac{\partial v_z}{\partial r}\bigg|_{R-\delta}\right) = 0. \quad (13)$$

For a thin liquid layer, the first term in the parenthesis is much smaller than the second, so that for non-wicked operation the boundary conditions become non-wicked:

$$v_z(R,z)=0 \text{ and } \frac{\partial v_z}{\partial r}\bigg|_{R-\delta} = 0. \quad (14)$$

For both wicked and non-wicked operation, a parabolic velocity profile in the annulus is expected, so a velocity profile that is quadratic in r is assumed. In wicked operation, the z-direction velocity must satisfy the boundary conditions for wicked operation in Eqs. (11) and (12). In non-wicked operation, the boundary conditions in Eqs. (12) and (14) must be satisfied. Quadratic velocity profiles satisfying these conditions are wicked:

$$v_z = \frac{6\dot{m}}{\pi\rho_l\delta^3(\delta-2R)}[R(R-\delta) + r(\delta-2R+r)] \quad (15)$$

non-wicked:

$$v_z = \frac{6\dot{m}}{\pi\rho_l\delta^3(5\delta-8R)}[R(R-2\delta) + 2r(\delta-R) + r^2]. \quad (16)$$

Vapor Flow Analysis: Pressure Drop:

The velocity profiles given in Eqs. (15) and (16) enable the evaluation of the convective (the first term) and viscous (the last term) momentum fluxes in Eq. (10). The vapor phase pressure drop in the evaporator section of the heat pipe is evaluated as $$\frac{\partial P_v}{\partial z}\bigg|_{R-\delta} = \frac{dP_v}{dz} \quad (17)$$
$$= \frac{8\mu_v \bar{v}_v}{(R-\delta)^2}(1+0.667a) - \frac{4}{3}\rho_v\frac{d}{dz}[\bar{v}_v^2(1-a/6+2a^2/45)] + \rho_v\omega^2 d\cos\alpha$$

where $$\bar{v}_v = -\frac{\dot{m}}{\pi\rho_v(R-\delta)^2} \quad (18)$$

and $$a = \frac{15}{22}\left[5 + \frac{18}{Re_r} - \sqrt{\left(5+\frac{18}{Re_r}\right)^2 - \frac{44}{5}}\right]. \quad (19)$$

The radial Reynolds number in the evaporator is defined as $$Re_r = \frac{\dot{Q}}{2\pi h_{fg} L_e \mu_v}. \tag{20}$$

Equation (17) models the pressure drop in the vapor phase of the working fluid using a 1-dimensional, laminar, incompressible (low-speed) vapor flow with mass addition. The first term in Eq. (17) is a viscous term, the second term is a convective term, and the third term is a body force term. The body force term is included to account for the rotation induced force acting on the vapor.

The vapor flow in the adiabatic section is treated as a 1-dimensional, fully developed, incompressible flow. Depending on the flow velocity, the flow is treated as either laminar or turbulent. The pressure drop in the vapor phase for the adiabatic section is given by $$\left.\frac{\partial P_v}{\partial z}\right|_{R-\delta} = \frac{dP_v}{dz} = \frac{f\dot{m}^2}{4\pi^2 \rho_v (R-\delta)^5} + \rho_v \omega^2 d\cos\alpha, \tag{21}$$

where the friction factor is given by $$f = \begin{cases} 64/Re_D & Re_D < 2300 \\ 0.25\left[\log_{10}\left(2.7\times 10^{-7} + \frac{5.74}{Re_D^{0.9}}\right)\right]^{-2} & Re_D \geq 2300 \end{cases} \tag{22}$$

and the axial flow Reynolds number is $$Re_D = \frac{2}{\pi}\frac{\dot{m}}{\mu_v(R-\delta)}. \tag{23}$$

The vapor flow in the condenser section is treated as an incompressible flow that can be either laminar or turbulent. The pressure drop term in Eq. (21) is modified by a pressure recovery (or inertial/convective) term. Pressure recovery in the condenser is attributed to the decrease in flow rate as the vapor flows through the condenser (the vapor flow rate decreases because a portion of the vapor condenses at the liquid-vapor interface). The decrease in vapor flow rate causes the vapor velocity to decrease and the pressure of the vapor to increase (pressure recovery). The total pressure drop in the condenser is defined as $$\left.\frac{\partial P_v}{\partial z}\right|_{R-\delta} = \frac{dP_v}{dz} = \frac{dP_c}{dz} + \frac{f\dot{m}^2}{4\pi^2\rho_v(R-\delta)^5} + \rho_v\omega^2 d\cos\alpha, \tag{24}$$

where the pressure recovery term is $$\frac{dP_c}{dz} = \frac{Re_r + 2}{(2L_e + 4L_a - 1.23Re_r L_c)}\frac{\dot{Q}^2}{\pi^2 h_{fg}^2 \rho_v(R-\delta)^4}, \tag{25}$$

and the radial Reynolds number in the condenser is given by $$Re_r = -\frac{\dot{Q}}{2\pi h_{fg} L_c \mu_v}. \tag{26}$$

Solving the Momentum Equation:

The velocity profiles in Eqs. (15) and (16), along with the expressions for the vapor phase pressure drop in Eqs. (17), (21), and (24), allow for the evaluation of each of the terms in the momentum balance of Eq. (10).

In wicked operation, liquid layer thickness $\delta$ is constant (and equal to the thickness of the annular gap). In non-wicked operation, liquid layer thickness $\delta$ is a function of the axial coordinate (z), while the dimensionless pressure difference, $\eta$, is constant (and equal to zero because the liquid and vapor are in direct contact). Therefore, evaluating Eq. (10) for wicked operation results in a first-order ordinary differential equation (ODE) for $\eta$ as a function of z. Similarly, for non-wicked operation, Eq. (10) leads to a first-order ODE describing $\delta$ as a function of z.

The symbolic programming software Mathematica® was used to determine the form of the ODEs governing wicked and non-wicked operation [Mathematica 4.0 for Students, v. 4.1.1.0. Wolfram Research, Inc. 100 Trade Center Drive. Champaign, Ill. 61820.]. Here, due to the length of the resulting expressions, the equations describing the behavior of the heat pipe in the wicked and non-wicked operating modes are simply stated as wicked:

$$d\eta/dz = fn(\eta, z) \tag{27}$$

non-wicked:

$$d\delta/dz = fn(\delta, z) \tag{28}$$

Initial Conditions:

Solving Eqs. (27) and (28) requires the determination of where wicked and non-wicked operation will occur within the given geometry. The rotation induced body force cannot be used to drive liquid from the condenser and adiabatic sections toward the evaporator section, since the condenser and adiabatic sections coincide with the axis of rotation. Therefore, the wick must be relied on to move liquid out of these sections.

Because there is no mechanism for vapor flow pressure recovery in the evaporator and adiabatic sections, the pressure of the vapor will be lowest in the condenser section. Also, the wick supplies a driving force to move liquid from the condenser to the evaporator. The driving force results from the pressure drop in the liquid phase as the liquid flows from the condenser to the evaporator. Therefore, in order for the wick to move liquid from the condenser section (without allowing for the unphysical situation where the pressure of the liquid is higher than the pressure of the vapor at a given z-location), a wet point ($\eta=0$) must exist in the condenser. With no pressure recovery in the vapor phase of the working fluid, the wet point would be located at the end (z=0) of the condenser section. With complete pressure recovery, the wet point would be located at the interface between the condenser section and the adiabatic section. Without knowledge of the z-location of the wet point or the amount of pressure recovery in the condenser, a shooting method is used to determine the value of $\eta$ at z=0.

The process of the shooting method requires starting with a speculated value of $\eta$ at $z=0$. Equation (27) is then integrated using a numerical integration method. The integration proceeds in the positive z-direction. If $\eta$ becomes negative in the condenser section, the initial guess for $\eta(z=0)$ is increased. If the adiabatic section is reached and $\eta>0$ everywhere within the condenser section, then the calculation is re-performed using a smaller value for $\eta(z=0)$. A bisection method is used to iterate this procedure until only one wet point exists in the condenser section. The bisection method converges to the correct value of $\eta(z=0)$ by halving the amount that the speculated value of $\eta(z=0)$ is either increased or decreased (depending on whether the previous value was too small or too large) after each iteration.

Once a suitable value for $\eta(z=0)$ is found (a value which gives only one wet point in the condenser), the calculation of Eq. (27) can proceed through the adiabatic zone and into the crank-shaped curve determining $\eta$ as a function of z.

In the crank-shaped curve, the rotation-induced force begins to act on both the liquid and the vapor. Because of the density difference between the two phases, the pressure rise in the liquid will be larger than the pressure rise in the vapor. The rapid increase in the pressure of the liquid may result in a second wet point located in the crank-shaped curve. At the second wet point, there is direct contact between the liquid and vapor phases, so the calculation is switched from the wicked to the non-wicked operating mode.

From the second wet point onward, Eq. (28), which describes heat pipe operation in the non-wicked regime, is used to estimate the liquid layer thickness as the liquid recedes from the wick and forms a thin layer against the wall of the heat pipe. If Eq. (28) predicts a liquid layer thickness that is larger than the annular gap distance, the liquid will fill the wick, and the calculation switches back to wicked operation [Eq. (27)].

Calculation of Saturation Temperature:

Once the liquid layer thickness and the difference in pressure between the liquid and the vapor have been calculated, Eqs. (15) and (16) are used to calculate the velocity of the liquid, and Eq. (6) is used to calculate the pressure of the liquid. Assuming that the liquid and vapor are saturated, the Clapeyron equation is used to calculate the temperature in the liquid and the vapor. The expressions used to calculate the temperature of the vapor and liquid are $$T_v = T_{v,wp}\exp\left[\frac{v_{fg}}{h_{fg}}\int_z \frac{dP_v}{dz}dz\right] \qquad (29)$$

$$T_l = T_{l,wp}\exp\left[\frac{v_{fg}}{h_{fg}}\left(\int_z \frac{dP_v}{dz}dz - \Delta P_{cap}\eta\right)\right], \qquad (30)$$

where the integrals in Eqs. (29) and (30) are integrated from the z-location at the first wet point to any z-location where the temperature of the liquid and vapor phases is to be determined.

Results:

The above mathematical analysis was performed for a crank-shaped heat pipe with a 0.5" (1.27 cm) outer diameter and a 0.035" (0.089 cm) wall thickness. The annular gap distance was 0.026" (0.066 cm), and the wick was made from 2 layers of 200×200 mesh screen. The lengths of each section of heat pipe were: 12" (30.5 cm) for the condenser section, 9.75" (24.8 cm) for the adiabatic section, and 33" (83.8 cm) for the evaporator section. The crank-shaped curve resides within the evaporator section. The maximum distance from the axis of rotation, d, was 9.5" (24.1 cm). The heat pipe was modeled in a stationary mode of operation as well as in a rotating mode of operation.

Figure 6:
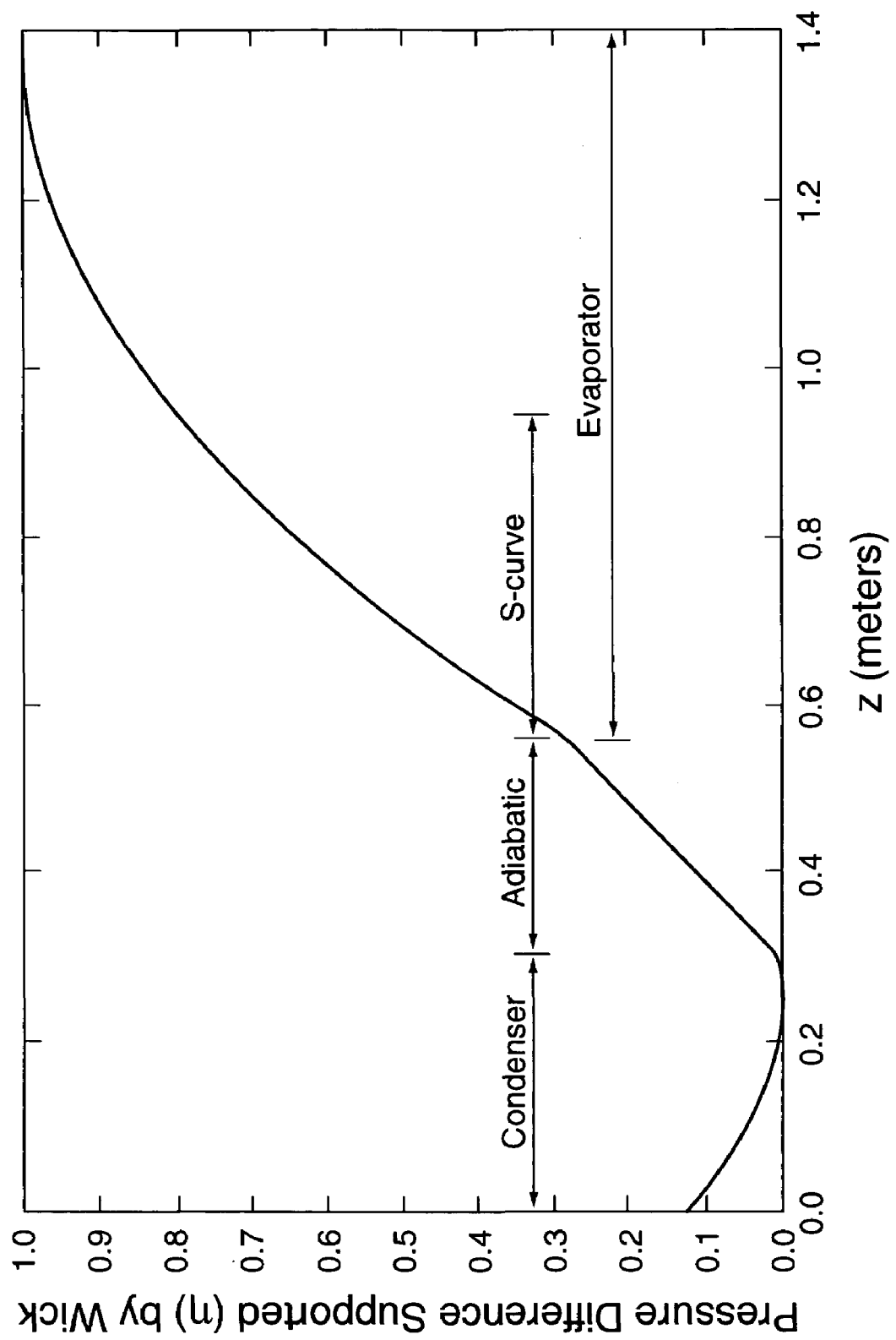
FIG. 6 graphically shows the capillary limit of the crank-shaped heat pipe filled with pentane at a 955 W heat load.
Figure 7:
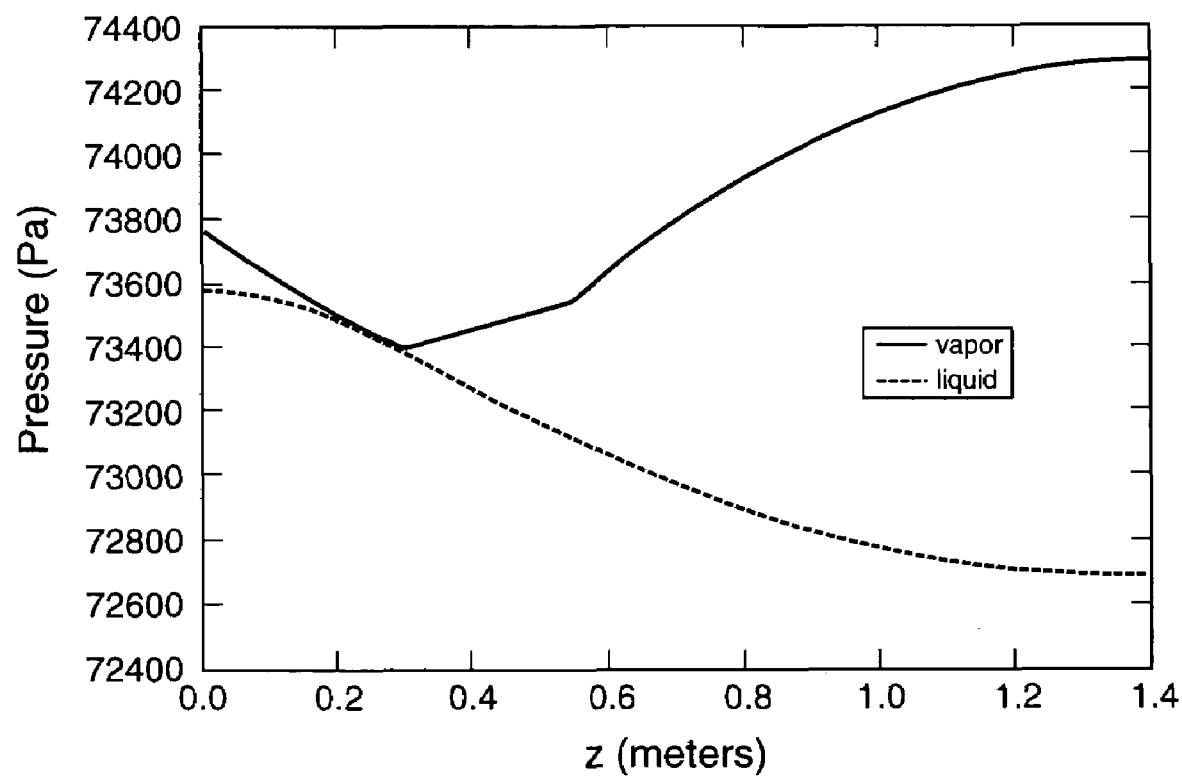
FIG. 7 graphically shows the pressure of vapor and liquid working fluid in a stationary, pentane filled crank-shaped heat pipe carrying a 955 W heat load.
Figure 8:
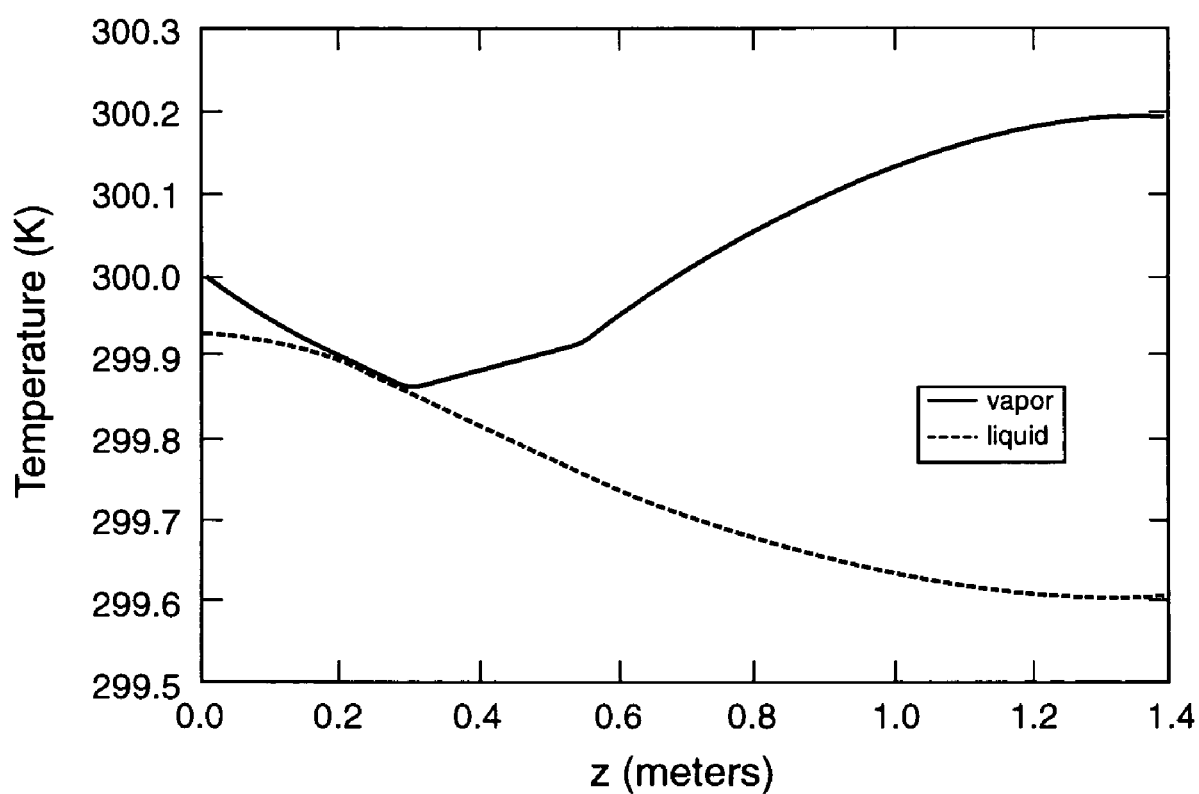
FIG. 8 graphically shows the temperature of vapor and liquid working fluid in a stationary, pentane filled crank-shaped heat pipe carrying a 955 W heat load.

FIGS. 6, 7, and 8 show the results for a stationary crank-shaped heat pipe filled with pentane with a 955 W heat load. The performance limit (the maximum heat transfer rate) of the heat pipe in the stationary operating mode occurs when the viscous losses in the working fluid are equal to the maximum capillary pressure difference that can be supported by the wick, $\Delta P_{cap}$. The performance limit is known as the capillary limit. The capillary limit is reached if $\eta \geq 1$ at any z-location in the heat pipe. FIG. 6 shows that with a 955 W heat load the capillary limit of the heat pipe is reached ($\eta=1$) in the evaporator section near $z=1.3$ m.

The crank-shaped heat pipe geometry described above was also modeled using the steady state heat pipe analysis program HTPIPE [Woloshun, K. A. et al. 1988. HTPIPE: A Steady State Heat Pipe Analysis Program. Los Alamos, N. Mex.: Los Alamos National Laboratory, LA-11324-M] in order to confirm the results. HTPIPE predicted a capillary limit of 934 W, so that in the stationary operating regime, the above analysis matched the results of HTPIPE within 3%. The agreement is significant, since HTPIPE has been benchmarked against experimental data for nearly thirty years.

FIGS. 7 and 8 show temperature and pressure distributions in the liquid and vapor phases. Pressure recovery in the condenser is confirmed from the fact that the wet point is not located at $z=0$. Also, for the stationary heat pipe, there is very little deviation from isothermal behavior, so that in stationary operation, the evaporator and condenser will operate at nearly the same temperature.

Figure 9:
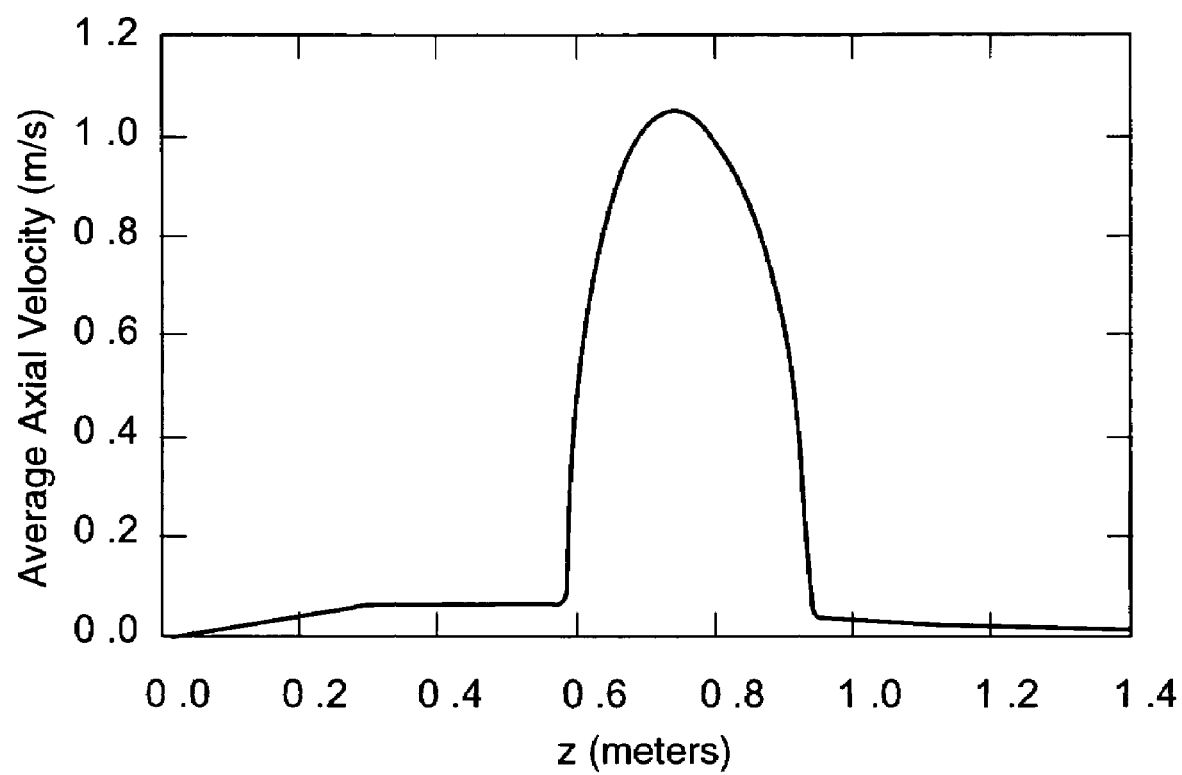
FIG. 9 graphically shows the average axial velocity of liquid working fluid in a pentane filled crank-shaped heat pipe carrying a 300 W heat load and rotating at 900 rpm.
Figure 10:
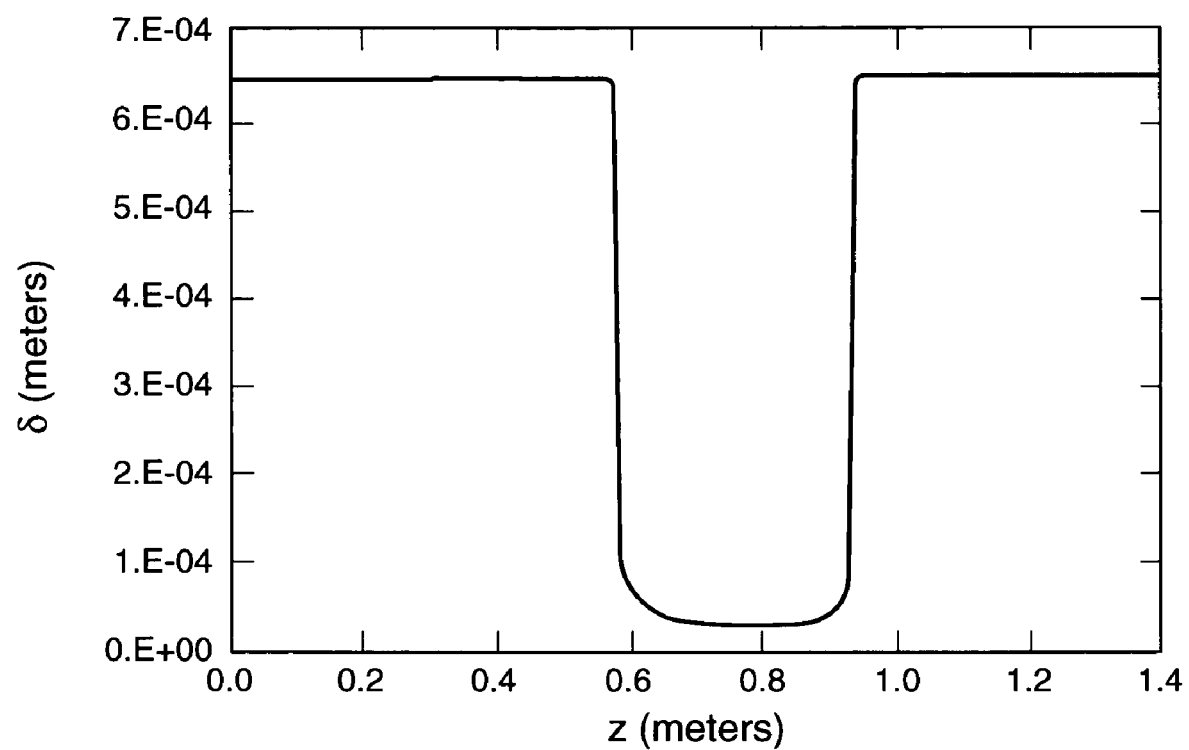
FIG. 10 graphically shows the liquid layer thickness of liquid working fluid in a pentane filled crank-shaped heat pipe carrying a 300 W heat load, rotating at 900 rpm.
Figure 11:
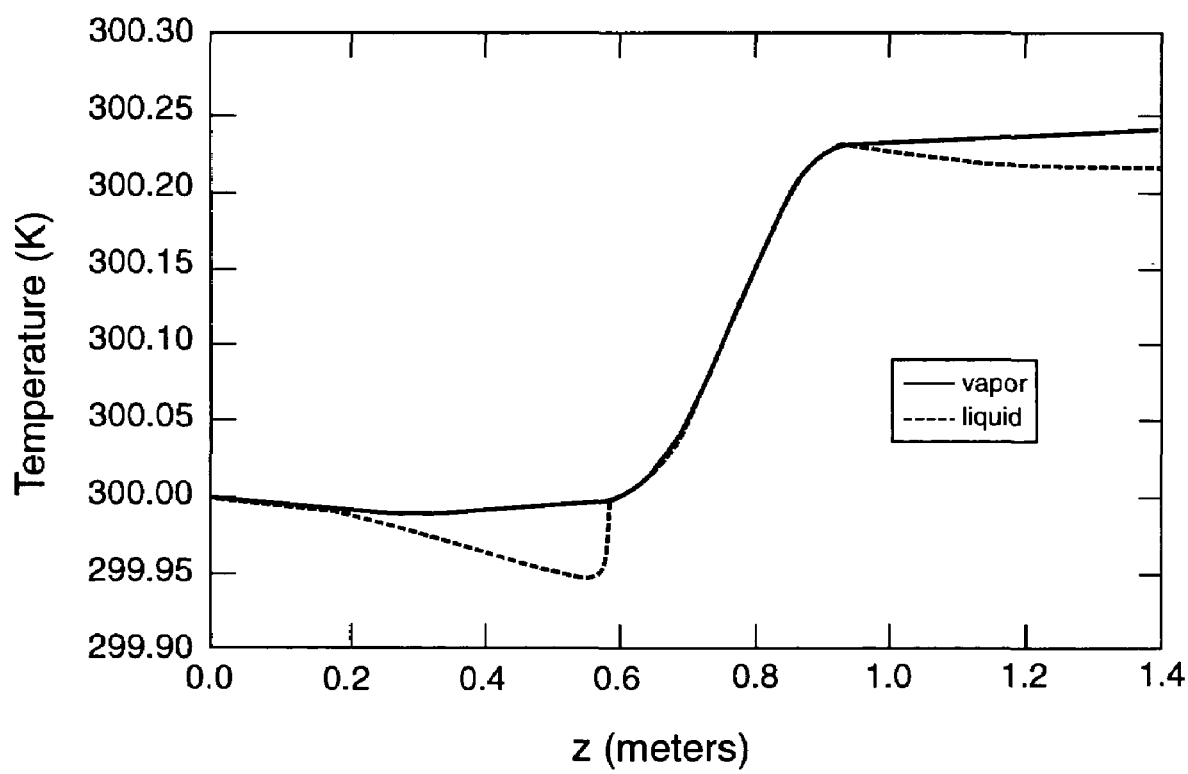
FIG. 11 graphically shows the temperature of vapor and liquid working fluid in a pentane filled crank-shaped heat pipe carrying a 300 W heat load, rotating at 900 rpm.

FIGS. 9, 10, and 11 present results for the pentane filled heat pipe carrying a 300 W heat load and rotating at 900 rpm. As the liquid enters the crank-shaped curve, the rotation induced body force acting in the flow direction accelerates the liquid as shown in FIG. 9. The acceleration causes a thinning of the liquid layer (by conservation of mass) as shown in FIG. 10. The relatively high velocity in the thin liquid layer causes the velocity gradient $\partial v_z/\partial r$ and the shear stress at the pipe wall to increase. The high shear forces oppose the rotation-induced force in the flow direction, limiting the resulting pressure (and temperature) rise.

As the liquid leaves the crank-shaped curve, and the body force acts perpendicular to the flow direction, the liquid decelerates. The deceleration causes the liquid layer thickness to increase. Near $z=0.95$ m, the liquid may enter the wick, and, thus, the remaining portion of the evaporator section operates in the wicked operating regime. The saturation temperatures plotted in FIG. 11 indicate that operation of the heat pipe in the presence of these large rotation induced forces (~200 g radial force field in the eccentrically rotating component of the evaporator) is not limited by a significant deviation from isothermal behavior. The results indicate that the present invention can be used to cool rotating machinery, because the rotating heat pipe is not limited by large temperature differences between the evaporator and condenser sections.

Entrainment Limit:

The analysis of the fluid flow at high rotation rates assumes that a stable liquid layer is formed against the wall of the heat pipe. An analysis was made to predict whether the interface between the liquid and the vapor would remain stable, allowing for the development of the thin liquid layer at the pipe wall and the large shear forces. As discussed by Hewitt and Hall-Taylor, [Hewitt, G. F. and Hall-Taylor, N. S. 1970. *Annular Two-Phase Flow*. Oxford: Pergamon Press], the interface between the phases of an annular two-phase flow is covered with a complex pattern of waves. An unstable flow configuration can cause the amplitude of these surface waves to grow. The resulting unbounded growth is referred to as the Kelvin-Helmoltz instability.

Through a perturbation analysis of the Navier-Stokes equations, Funada and Joseph [Funada, T. and Joseph, D. D. 2001. Viscous Potential Flow Analysis of Kelvin-Helmholtz Instability in a Channel. *Journal of Fluid Mechanics* v. 445] developed analytical expressions for the critical relative velocity of the liquid-vapor flow between two parallel plates. Exceeding the critical velocity leads to an unstable situation and wave growth.

The analysis by Funada and Joseph is performed in a Cartesian geometry, with a stratified liquid-gas flow in a horizontal flow configuration. Gravity is assumed to act perpendicular to the liquid-vapor interface. The stability analysis leads to an expression for the critical relative velocity as a function of the height of the gas layer, the height of the liquid layer, the densities and viscosities of both phases, and the acceleration due to gravity.

The results of the stability analysis are extended to the rotating heat pipe geometry by letting $\delta$ represent the height of the liquid layer, letting $R-\epsilon$ represent the height of the vapor layer, and by substituting $\omega^2(d+R-\delta)\sin\alpha$ for the acceleration due to gravity. The expression for the critical relative velocity becomes $$(\Delta V_c)^2 = (\bar{v}_z - \bar{v}_v)^2_{critical} \quad (31)$$
$$= \frac{(\rho_l - \rho_v)}{\rho_v} R(d + R - \delta)\omega^2 \sin\alpha$$
$$\frac{[1 - \delta/R + (\mu_v \delta)/(\mu_l R)]}{[1 - \delta/R + (\mu_v^2 \rho_l \delta)/(\mu_l^2 \rho_v R)]}.$$

Figure 12:
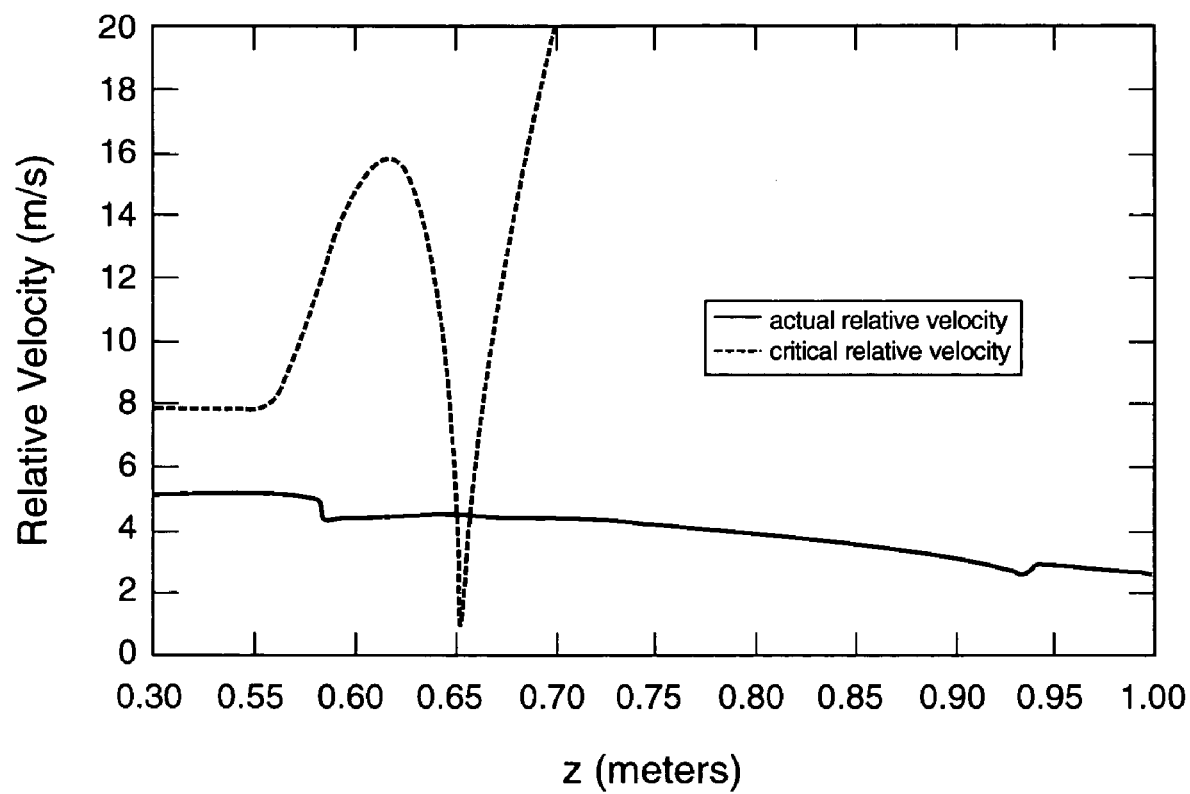
FIG. 12 graphically shows the critical and actual relative velocities for z-locations corresponding to the non-wicked region of the heat pipe (in the crank-shaped curve) of one embodiment of the crank-shaped heat pipe.
Figure 13:
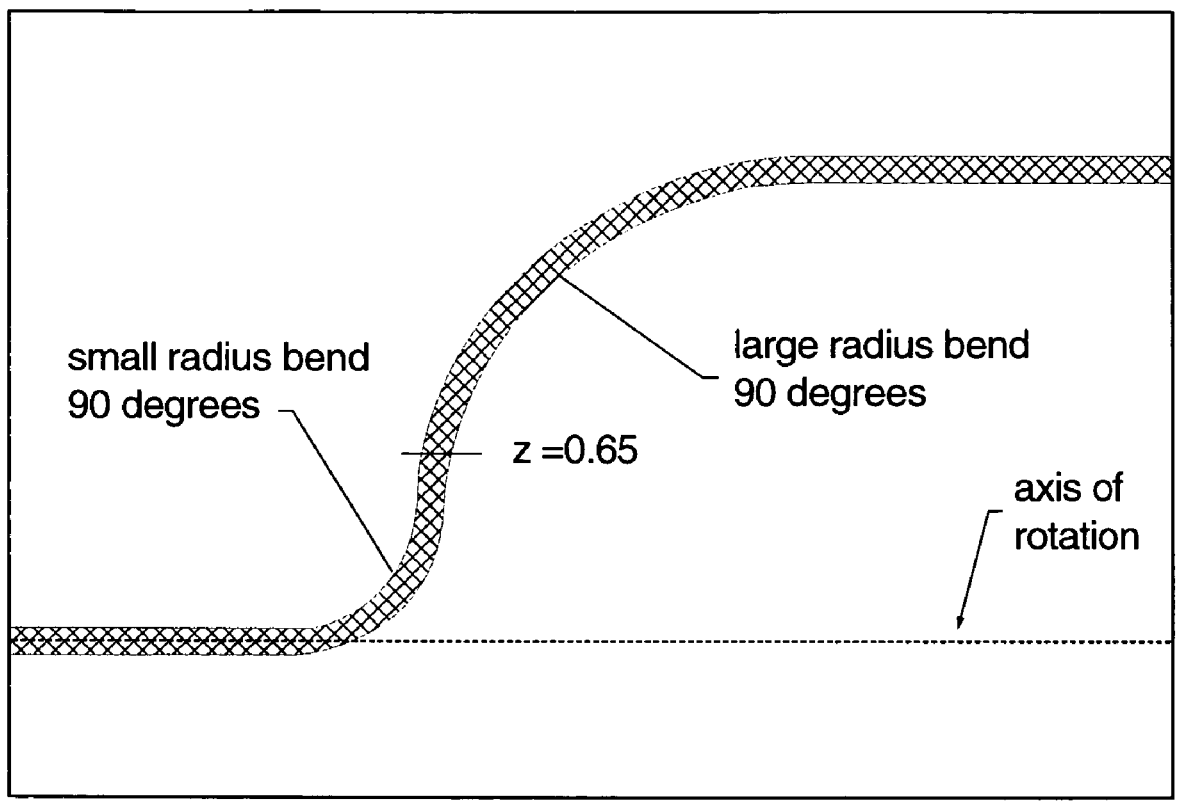
FIG. 13 is a side-view of the crank-shaped curve in one embodiment of the present invention.

Equation (31) was computed and compared to the actual relative velocity for the pentane filled heat pipe rotating at 900 rpm. The stability analysis of the liquid layer is only applicable in regions of the heat pipe where non-wicked operation is present (since the wick would otherwise protect the liquid from being entrained in the vapor flow). The critical and actual relative velocities for z–locations corresponding to the non-wicked region of the heat pipe (in the crank-shaped curve) are shown in FIG. 12. A side-view of the crank-shaped curve is shown in FIG. 13. FIG. 12 shows that an instability ($\Delta V_c < \Delta V_{actual}$) occurs at a z-location of ~0.65 m. This location corresponds to the intersection of the small and large radius bends. Equation (31) shows that instability will develop in sections of the pipe oriented perpendicular to the axis of rotation (as is the intersection near 0.65 m) because $\sin\alpha = \Delta V_c = 0$.

Figure 14:
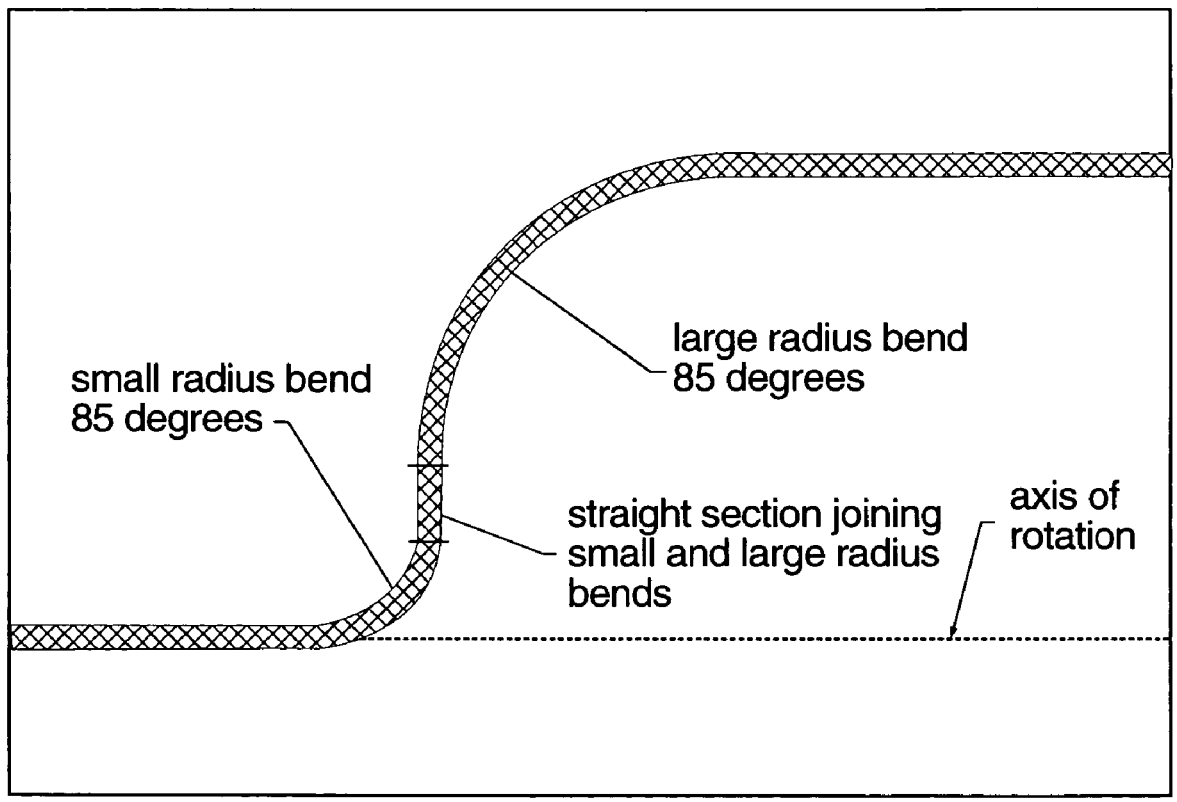
FIG. 14 is a side-view of the crank-shaped curve in one embodiment of the present invention.
Figure 15:
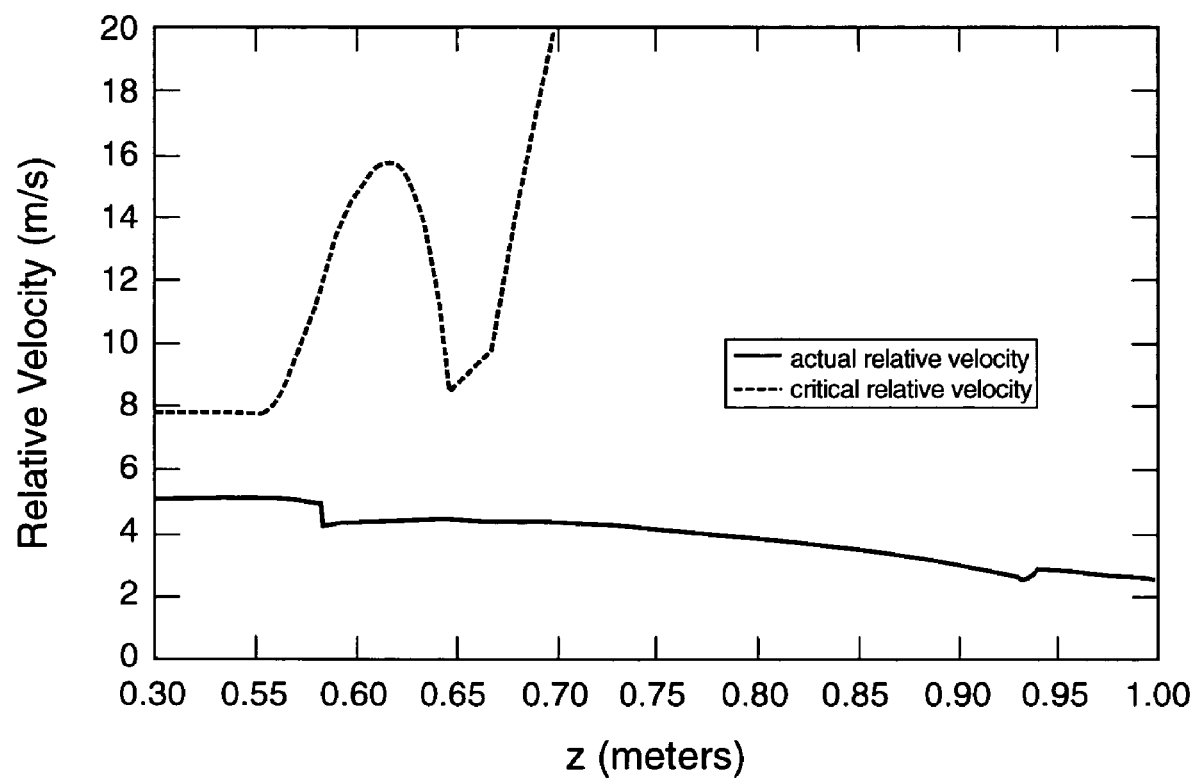
FIG. 15 graphically shows the critical and actual relative velocities for z-locations corresponding to the non-wicked region (in the crank-shaped curve) of a modified embodiment of the crank-shaped heat pipe.

The stability analysis predicts an entrainment of liquid into the vapor flow and a failure of the heat pipe in sections of the heat pipe oriented perpendicular to the axis of rotation, no matter how small the relative velocity. The geometry change illustrated in FIG. 14 was introduced to eliminate the aforementioned instability and to increase the performance limit of the rotating heat pipe. Thus, two 85 degree bends were connected by a short straight section, rather than using two 90-degree bends. In the modified geometry, a component of the rotation-induced force is always acting perpendicular to the liquid-vapor interface. The perpendicular force component stabilizes the liquid layer. As shown in FIG. 15, the incorporation of 85-degree bends provided a factor of two margin in the stability limit calculation (when data is compared with FIG. 12).

The Present Invention Heat Pipe Using Other Working Fluids:

With the proper choice of working fluid, the rotating heat pipe shown in FIG. 1 can be used in the cryogenic temperature range (temperatures less than 200 K), the low temperature range (200 K to 700 K), and in the high temperature range (temperatures greater than 700 K). Table 1 details heat pipe operation over the entire temperature range (from cryogenic temperatures to high temperatures). The mathematical model has been used to simulate crank-shaped heat pipes filled with helium, hydrogen, pentane, and potassium in stationary operation and rotating at 3600 rpm. Table 1 includes columns of the heat transfer rate at which the capillary limit is reached during stationary operation (the performance limit for the stationary heat pipe), the difference in saturation temperature between the evaporator and condenser sections of the heat pipe, (the deviation from isothermal behavior during rotating operation), and the temperature of the condenser section (the operating temperature of the heat pipe).

| Working Fluid | Capillary Limit in Stationary Operation (W) | $\Delta T$ at 3600 rpm (K) | $T_{cond}$ (K) |
|---|---|---|---|
| Helium | 7.4 | 0.8 | 4.2 |
| Hydrogen | 300 | 0.4 | 20 |
| Pentane | 955 | 4 | 300 |
| Potassium | 5950 | 12 | 1000 |

Justification of Assumptions:

Throughout the analysis, the liquid was assumed to be in contact with the wall of the heat pipe and evenly distributed around the circumference. Additionally, the only component of the rotation-induced force considered when calculating temperature and pressure profiles was the component acting in the flow direction.

In the actual device, the force component acting perpendicular to the flow direction will cause a redistribution of the liquid around the circumference of the pipe. Under the influence of the large rotation induced forces, the liquid will shift to one side of the heat pipe (puddle flow), rather than forming within the annulus. Although the annular liquid layer will not be present in the actual device, the force component perpendicular to the flow direction will force the liquid to be in contact with the wall, so that the thin liquid layer and high shear forces are generated. The same forces act on the liquid in the puddle flow and annular flow regimes, so that the results of the analysis (the temperature difference between the evaporator and condenser sections) will not be significantly altered by the development of puddle flow.

The conclusions drawn from the simplified fluid dynamic analysis can be extended to the actual flow configuration. The most important conclusions are that (1) the liquid interaction with the wall (the shear stress) is used to prevent excessive increases in saturation temperature and (2) the rotation induced force component acting perpendicular to the flow direction is essential for producing a stable liquid-vapor flow configuration.

Crank-Shaped Heat Pipe Assembly

The crank-shaped heat pipe is assembled from a cylindrical tube, end caps, a wick structure, and a working fluid. The material composition of the cylindrical tube selected for the heat pipe may comprise any material suitable for the selected application. However, metal tubes are the most common, including such metals as copper, stainless steel, or low-carbon steels.

The screen used to make the wick structure is cut on a bias (the mesh of the screen is oriented 45 degrees from the longitudinal axis of the cylindrical wick). The screen is then cut to the length of the cylindrical tube and a width that when wrapped into a cylindrical form will result in at least 2 layers of screen.

Once cut, the screen is rolled on a mandrel to form the cylindrical wick. A first embodiment, shown in FIGS. 2a and 2b, involves the use of straight wires as spacer wires. These straight wires are spot welded along the longitudinal axis of the screen prior to rolling the wick, and provide spacing between the wick structure and the cylindrical tube. The screen may then be spot welded in order to ensure that a constant circular cross-section of the wick structure is maintained during installation.

A second embodiment, shown in FIG. 3, involves choosing a mandrel size so that the rolled screen will initially be undersized (diameter is less than the final wick diameter) in order to facilitate inserting the wick into a long pitch spring (a spring wound to a one inch pitch or larger with an outside diameter equal to the inside diameter of the tube of the heat pipe). When the rolled screen is inserted into the spring and released, the screen relaxes to conform to the inside diameter of the spring. Again, the layered screen may then be spot-welded in order to stabilize the screen geometry during installation.

Figure 4:
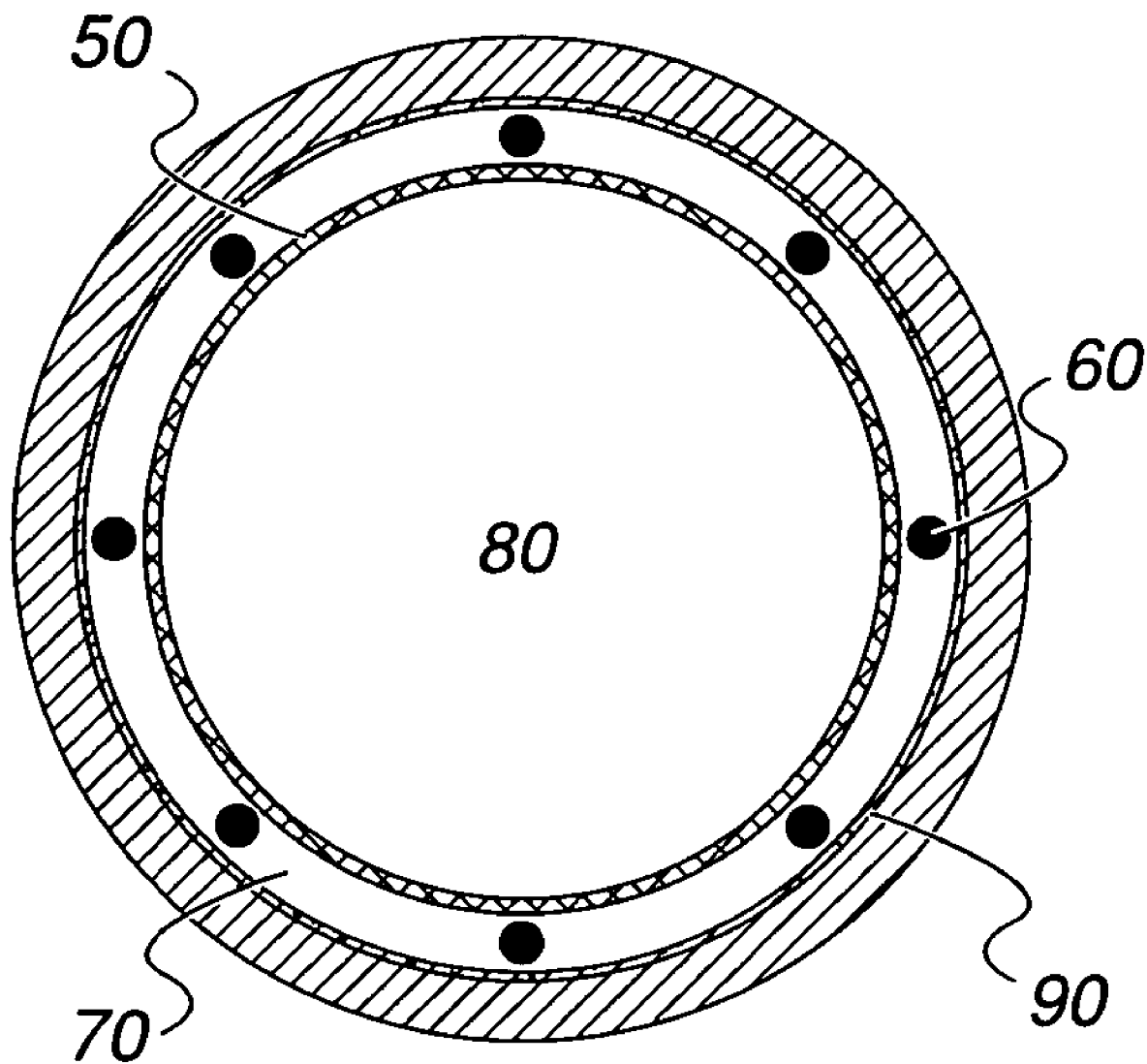
FIG. 4 is a cross-sectional view of a multi-wick embodiment of the crank-shaped heat pipe.

A third embodiment of wick structure involves the use of an outer wick shown in FIG. 4. A first screen is rolled, inserted into the cylindrical tube, and released. This first screen will relax to the point of resting against the inner wall of the cylindrical tube. The wick structure of the second embodiment, with a second mesh screen, is then inserted into the tube within the first screen, thereby creating the configuration shown in FIG. 4, where the first mesh screen is separated from the second mesh screen by spacer wires.

The wick structure is then sealed with a plug on the end of the evaporator section in order to allow full capillary pressure to develop during stationary applications. After the wick structure has been inserted into the cylindrical tube, the cylindrical tube is then bent, using any suitable process known to one skilled in the art, to form the first and second curves that provide the crank shape. The first and second curves range from greater than zero to less than 90 degrees. However, a preferred embodiment has the first and second curves range from about 75 to about 85 degrees. The first and second curves define a small radius and a large radius that are a minimum of 2 inches. The radial distance between the centerline of the condenser section and the evaporator section ranges from 0 to 16 inches.

End caps are then brazed onto both ends of the cylindrical tube completing the structure of the crank-shape heat pipe. At one end of the heat pipe (either the condenser or evaporator end), the end cap includes a means for accessing the interior in order to evacuate all gases from within the heat pipe, and then charge the heat pipe with a working fluid. The working fluid may be selected from any suitable material known to those skilled in the art. Typically, the working fluid is helium, hydrogen, pentane, or potassium. After charging, the means used to access the interior is then sealed.

Conclusion:

The results of the mathematical model show that the crank-shaped heat pipe, a passive heat transfer device, can be used to cool rotating machinery. The model shows that heat pipes can be used to cool machines in stationary operation and while rotating at speeds up to 3600 rpm. With the proper choice of working fluid, machines operating at cryogenic temperatures, room temperature, or at high temperatures can also be cooled using the rotating heat pipe.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A crank-shaped heat pipe for cooling rotating machinery, comprising:
   (a) a cylindrical tube defining an inner wall, a condenser section, an evaporator section, and an adiabatic section,
   (b) a wick structure within said cylindrical tube,
   (c) a working fluid within said cylindrical tube for use as a heat transfer mechanism, and
   (d) said evaporator section or said adiabatic section defining a first curve and a second curve, said first curve and said second curve ranging from about 75 degrees to about 85 degrees, where said first and second curves reduce said working fluid instability and increase said heat transfer capability of said heat pipe, said wick structure including a first mesh screen and spacer wires, said first mesh screen separated from said inner wall by said spacer wires.

2. The heat pipe of claim 1, where said wick structure further comprises a second mesh screen, said second mesh screen in contact with said inner wall and said first mesh screen separated from said second mesh screen by said spacer wires.

3. The beat pipe of claim 1, where said working fluid is selected from the group consisting of: helium, hydrogen, pentane, and potassium.

4. The heat pipe of claim 1, where said first and second curves define a small radius and a large radius, where said small and large radii are a minimum of 2 inches.

5. The heat pipe of claim 1, where a radial distance between said condenser section and said evaporator section ranges from 0 to 16 inches.

6. The heat pipe of claim 1 where said cylindrical tube comprises metals selected from the group consisting of copper, stainless steel, and low-carbon steels.

7. The heat pipe of claim 1, where said wick structure comprises a plug that seals said evaporator section to allow full capillary pressure to develop during stationary applications.

8. A method of making a crank-shaped heat pipe with an evaporator section, an adiabatic section, and a condenser section, comprising:
   (a) forming and inserting a cylindrical wick structure into a cylindrical tube, said wick structure including a first mesh screen and spacer wires, said first mesh screen separated from said inner wall by said spacer wires, (b) forming a first curve and a second curve in said cylindrical tube, said first curve and said second curve ranging from about 75 degrees to about 85 degrees, (c) brazing caps onto both ends of said crank-shape heat pipe, (d) evacuating resident gases from within said crank-shape heat pipe, (e) charging a working fluid into said crank-shape beat pipe, and (f) sealing said crank-shape heat pipe.

9. The method of making a crank-shaped heat pipe in claim 8, where forming and inserting said cylindrical wick structure comprises:

(a) cutting a section of a screen to a length of said cylindrical tube, (b) spot-welding spacer wires to said screen, (c) rolling said section of said screen two revolutions or more to form a cylindrical wick structure, and (d) inserting said cylindrical wick structure into said cylindrical tube.

10. The method of making a crank-shaped heat pipe in claim 8, where forming and inserting said cylindrical wick structure comprises:

(a) cutting a section of a screen to a length of said cylindrical tube, (b) rolling said section of said screen two revolutions or more to form a screen cylinder, (c) placing said screen cylinder into a spring sized to fit the length and diameter of said cylindrical tube to form said cylindrical wick structure, and (d) inserting said cylindrical wick structure into said cylindrical tube.

11. The method of making a crank-shaped heat pipe in claim 8, where forming and inserting said cylindrical wick structure comprises:

(a) cutting a first section of screen and a second section of a screen to a length of said cylindrical tube, (b) rolling said first section of screen two revolutions or more to form a first cylindrical wick, (c) inserting said first cylindrical wick into said cylindrical tube, (d) spot-welding spacer wires to said second section of said screen, (e) rolling said second section of said screen two revolutions or more to form a second cylindrical wick, and (f) placing said second cylindrical wick within said first cylindrical wick to form said cylindrical structure within said cylindrical tube.

12. The method of making a crank-shaped heat pipe in claim 8, where said first curve and said second curve are formed with a minimum radii of 2 inches.

13. The method of making a crank-shaped heat pipe in claim 8, where forming and inserting said cylindrical wick structure further includes sealing said wick structure with a plug on said evaporator section.

* * * * *